United States Patent
Lin

(10) Patent No.: US 7,148,793 B2
(45) Date of Patent: Dec. 12, 2006

(54) TIRE PARAMETER SENSING SYSTEM HAVING AUTO-LOCATION FEATURE AND ASSOCIATED METHOD

(75) Inventor: Xing Ping Lin, Orchard Lake, MI (US)

(73) Assignee: TRW Automotive US LLC, Livonia, MI (US)

( * ) Notice: Subject to any disclaimer, the term of this patent is extended or adjusted under 35 U.S.C. 154(b) by 311 days.

(21) Appl. No.: 10/768,576

(22) Filed: Jan. 30, 2004

(65) Prior Publication Data

US 2005/0258951 A1    Nov. 24, 2005

(51) Int. Cl.
*B60C 23/02* (2006.01)

(52) U.S. Cl. ............ 340/442; 340/445; 340/446; 340/447; 340/571.1; 73/146.2; 73/146.3; 73/146.4; 73/146.5

(58) Field of Classification Search ........ 340/442, 340/445, 446, 447, 572.1; 73/146.2, 146.3, 73/146.4, 146.5
See application file for complete search history.

(56) References Cited

U.S. PATENT DOCUMENTS

| 5,808,190 A * | 9/1998 | Ernst ............... 73/146.5 |
| 6,412,165 B1 * | 7/2002 | White ............... 29/622 |
| 6,838,985 B1 * | 1/2005 | Ghabra et al. ........ 340/445 |

\* cited by examiner

*Primary Examiner*—Tai Nguyen
(74) *Attorney, Agent, or Firm*—Tarolli, Sundheim, Covell & Tummino LLP

(57) ABSTRACT

A tire parameter sensing system (12) for a vehicle (10) having a plurality of tires (16, 18, 20, 22) comprises a plurality of tire-based units (34, 36, 38, 40). Each tire-based unit (34, 36, 38, 40) being configured to receive initiation signals and, in response thereto, to transmit response signals (54, 56, 58, 60). A vehicle-based unit (42) receives the response signals (54, 56, 58, 60) and transmits the initiation signals (90). A plurality of signal masking devices (44, 46, 48, 50) is coupled to the vehicle-based unit (42). The signal masking devices (44, 46, 48, 50) have associated tire locations on the vehicle (10) and are actuatable for masking the initiation signals (90) near the associated tire locations. The vehicle-based unit (42) controls the signal masking devices (44, 46, 48, 50) so as to control the tire location from which a tire-based unit responds to the initiation signals (90).

14 Claims, 4 Drawing Sheets

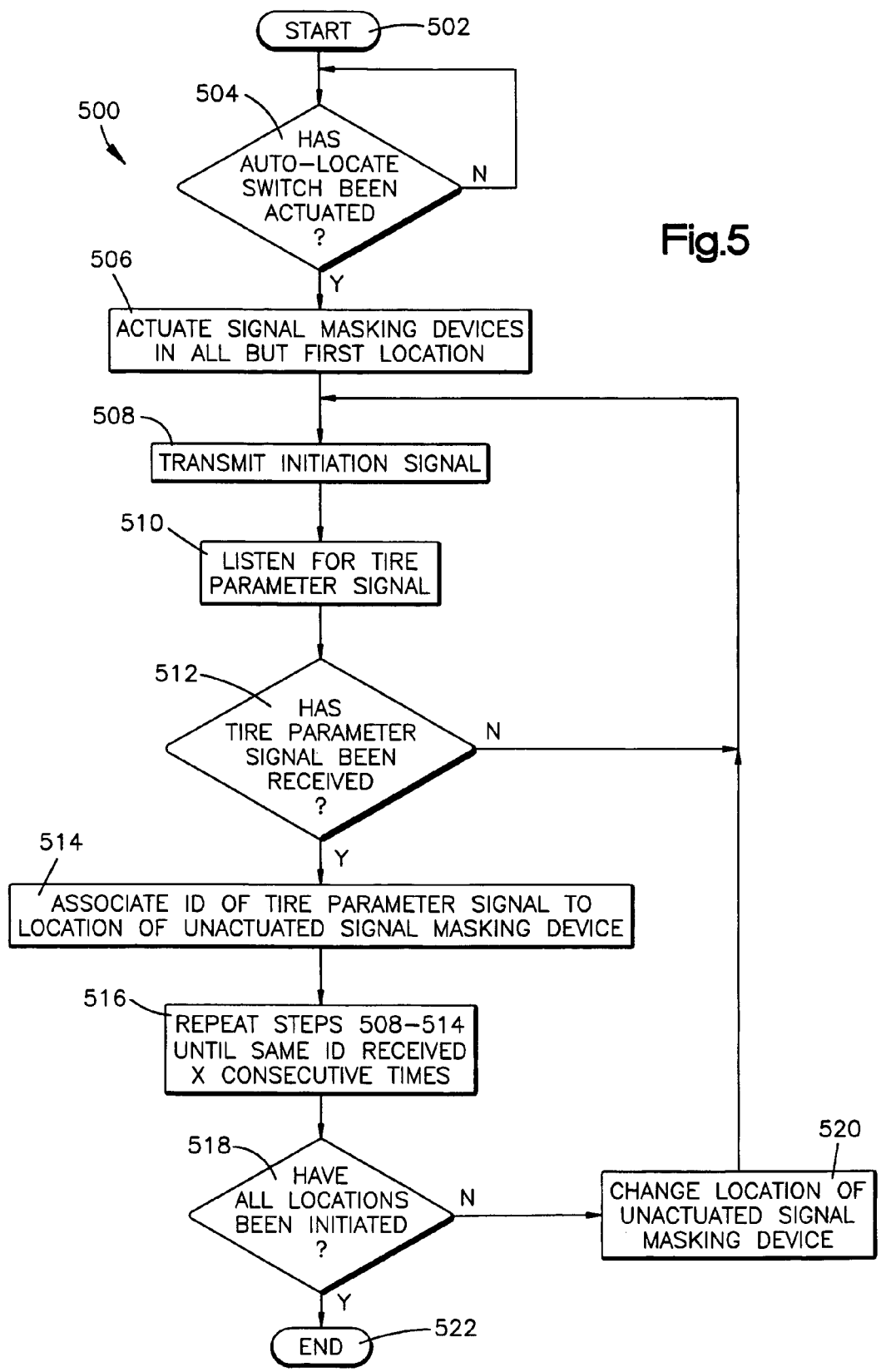

TIRE PARAMETER SENSING SYSTEM HAVING AUTO-LOCATION FEATURE AND ASSOCIATED METHOD

TECHNICAL FIELD

The present invention relates to a tire parameter sensing system for a vehicle and an associated method. More particularly, the present invention relates to a tire parameter sensing system for a vehicle in which the location on the vehicle of tire-based units is determined and an associated method.

BACKGROUND OF THE INVENTION

Tire parameter sensing systems for vehicles typically include a plurality of tire-based units and a single vehicle-based unit. Each tire-based unit is associated with a tire of the vehicle and is operative to sense at least one parameter of the tire, such as temperature, pressure, etc., and to transmit a parameter signal indicative of the sensed parameter(s). The vehicle-based unit receives parameter signals from the tire-based units and provides an indication to the vehicle operator of the sensed tire parameters.

With the use of run flat tire technology on modern vehicles, it may be difficult for a vehicle operator, when notified of an improper tire parameter, to determine the location of the tire having the improper parameter. For example, when a low tire pressure condition is sensed in one tire of a vehicle having four low profile, run flat tires, the vehicle operator may have difficulty in determining which tire has the low pressure condition by simply looking at the tires. As a result, it is becoming increasingly desirable for tire parameter sensing systems to indicate the corner location on the vehicle at which the improper tire parameter has been sensed.

Many current tire parameter sensing systems assign unique identification numbers to each tire-based unit. The vehicle-based unit is programmed with the identification numbers of the tire-based units and the associated corner location on the vehicle of the each tire-based unit. For example, an identification number of a tire-based unit that is located in a tire located in a front, left corner location on the vehicle is programmed into the vehicle-based unit and is associated with the front, left corner location. Thus, when the vehicle-based unit receives a parameter signal that includes the identification number, the vehicle-based unit associates the tire parameters received in the parameter signal with the front, left corner location on the vehicle.

It is common during routine maintenance of a vehicle for the tires of the vehicle to be rotated. Rotation of the tires places the tire-based units in different locations on the vehicle. As a result, the vehicle-based unit must be reprogrammed to associate the identification numbers of the tire-based units with the different corner locations on the vehicle. Reprogramming the vehicle-based unit can be labor intensive. Thus, a tire parameter sensing system in which the vehicle-based unit is automatically reprogrammed with identification numbers of the tire-based units and the associated vehicle corner locations is desirable.

Copending U.S. patent application Ser. No. 09/687,709, which is assigned to the assignee of the present invention, discloses a tire condition communication system in which low frequency initiators are controllably coupled to the vehicle-based unit. Each low frequency initiator is associated with a corner location on the vehicle. The vehicle-based unit systematically controls the low frequency initiators to transmit low frequency initiation signals. The tire-based units, in response to receiving a low frequency initiation signal from an adjacent low frequency initiator, transmit tire condition signals. The vehicle-based unit receives the tire condition signals and associates identification numbers received in tire condition signals with the corner location on the vehicle of the low frequency initiator. For example, when a first identification number is received in response to the front left low frequency initiator transmitting an initiation signal, the vehicle-based unit associates the first identification number with the front, left corner location of the vehicle. As a result, the tire condition communication system provides for automatic programming of the corner locations of the tire-based units.

SUMMARY OF THE INVENTION

The present invention relates to a tire parameter sensing system for a vehicle having a plurality of tires. The tire parameter sensing system comprises a plurality of tire-based parameter sensing units. Each tire-based unit has an associated tire and is configured to receive initiation signals and, in response thereto, to transmit response signals. The tire parameter sensing system also comprises a vehicle-based unit for receiving response signals from the tire-based units and for transmitting the initiation signals to the tire-based units. The tire parameter sensing system further comprises a plurality of signal masking devices that are coupled to the vehicle-based unit. Each of the signal masking devices has an associated tire location in which a tire-based unit is located. Each signal masking device is actuatable for masking the initiation signals near its associated tire location. The tire-based units only respond to unmasked initiation signals. The vehicle-based unit controls the signal masking devices so as to control the associated tire location from which a tire-based unit responds to the initiation signals.

According to another aspect, the present invention includes a tire parameter sensing system for a vehicle having a plurality of tires. The tire parameter sensing system comprises a plurality of tire-based units. Each of the plurality of tire-based units has an associated tire and includes a receiving portion for receiving an initiation signal, a sensing portion for sensing a parameter of the associated tire, and a transmitting portion for transmitting a parameter signal indicative of the sensed parameter. Each of the tire-based units is responsive to a received initiation signal having a signal-to-noise ratio exceeding a predetermined value for transmitting the parameter signal. The tire parameter sensing system also comprises a vehicle-based unit that includes a transmitter for transmitting initiation signals to the tire-based units and a receiver for receiving parameter signals from the tire-based units. The tire parameter sensing system further comprises a plurality of noise sources that are coupled to the vehicle-based unit and are actuatable by the vehicle-based unit for transmitting noise. Each of the noise sources has an associated tire-based unit. The vehicle-based unit controls initiation the tire-based units by controlling actuation of the noise sources.

According to yet another aspect, the present invention relates to a method for determining associated locations on a vehicle of tire-based units of a tire parameter sensing system. The method comprises the steps of: transmitting an initiation signal from a vehicle-based unit; controlling actuation of a plurality of signal masking devices during transmission of the initiation signal so that only a tire-based unit located near a first signal masking device responds to the transmitted initiation signal; receiving a parameter signal from the tire-based unit responding to the initiation signal; and associating the responding tire-based unit with a location on the vehicle of the first signal masking device.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 5 is a flow diagram illustrating an exemplary process performed by the tire parameter sensing system of the present invention;

DETAILED DESCRIPTION OF THE INVENTION

Figure 1:
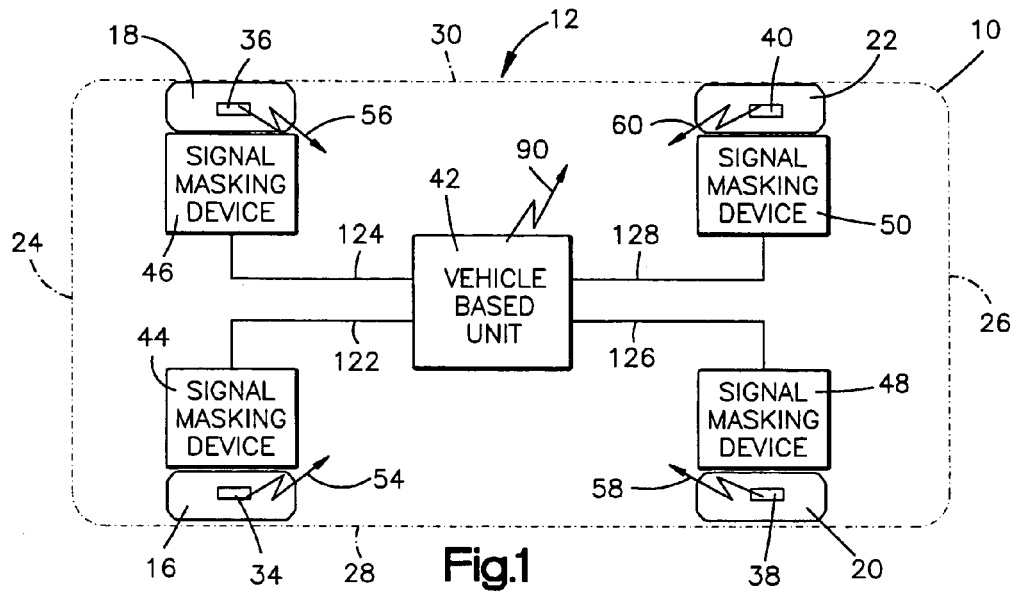
FIG. 1 schematically illustrates a vehicle including a tire parameter sensing system constructed in accordance with an exemplary embodiment of the present invention.

FIG. 1 schematically illustrates a vehicle 10 including a tire parameter sensing system 12 constructed in accordance with an exemplary embodiment of the present invention. For illustrative purposes, the vehicle 10 of FIG. 1 is an automobile having four tires 16, 18, 20, and 22. The present invention can be used with vehicles having a number of tires other than four.

The vehicle 10 has a front 24, a rear 26, and opposite left and right sides 28 and 30, respectively. FIG. 1 illustrates tire 16 at a front left corner location of the vehicle 10. Tire 18 is located at a front right corner location of the vehicle 10. Tire 20 is located at a rear left corner location of the vehicle 10 and tire 22 is located at a rear corner right location of the vehicle 10.

The tire parameter sensing system 12 includes four tire-based units 34, 36, 38, and 40, a vehicle-based unit 42, and four signal masking devices 44, 46, 48, and 50. Each tire 16, 18, 20, and 22 of the vehicle 10 includes an associated tire-based unit 34, 36, 38, and 40, respectively, for sensing at least one parameter, e.g., pressure, temperature, etc., of the tire and for providing a tire parameter signal 54, 56, 58, and 60, respectively, to the vehicle-based unit 42. The tire parameter signals 54, 56, 58, and 60 are indicative of the sensed parameter(s) of the tires 16, 18, 20, and 22, respectively. Preferably, the tire parameter signals 54, 56, 58, and 60 are radio frequency ("RF") signals.

Figure 2:
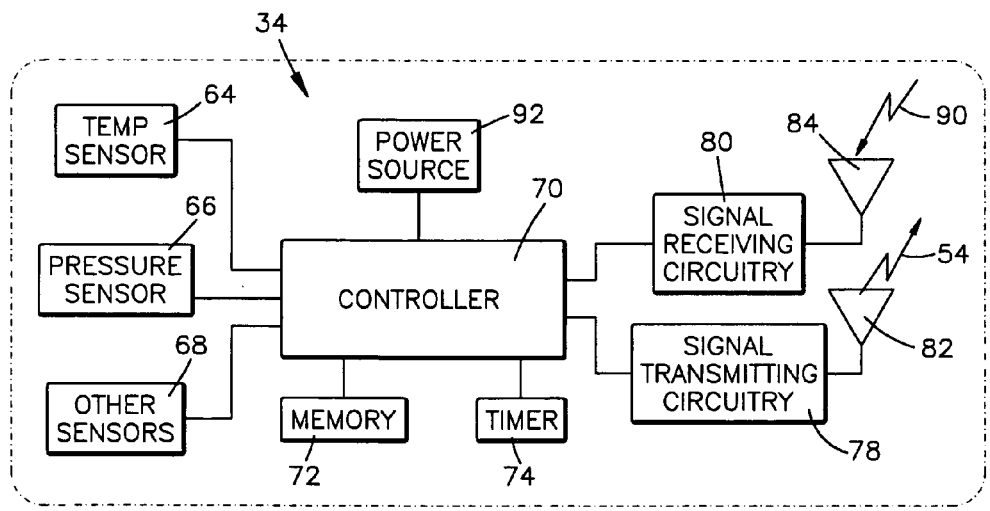
FIG. 2 is a schematic block diagram of an exemplary tire-based unit of the tire parameter sensing system of FIG. 1.

FIG. 2 is a schematic block diagram of an exemplary embodiment of the tire-based unit for the parameter sensing system 12 of FIG. 1. For purposes of example, FIG. 2 only illustrates tire-based unit 34. Tire-based units 36, 38, and 40 may have structures similar to tire-based unit 34 and operate in a manner similar to tire-based unit 34.

The tire-based unit 34 includes a temperature sensor 64, a pressure sensor 66, and other sensors 68. The temperature sensor 64 is operable for sensing temperature within the associated tire 16 and providing temperature signals. The pressure sensor 66 is operable for sensing pressure within the associated tire 16 and for providing pressure signals. The other sensors 68 are operable for sensing other parameters of either the associated tire 16 or the tire-based unit 34 and for providing other parameter signals indicative of the other sensed parameters. For example, the other sensors 68 may include a voltage sensor for determining a supply voltage within the tire-based unit 34.

The tire-based unit 34 also includes a controller 70. The controller 70 is preferably a microcomputer. Alternatively, the controller 70 may be formed from discrete circuitry, an application-specific-integrated-circuit ("ASIC"), or any other type of control circuitry. The controller 70 is operatively coupled to the temperature sensor 64, the pressure sensor 66, and the other sensors 68 and receives the temperature signals, the pressure signals, and the other parameter signals. The controller 70 performs a tire parameter sensing algorithm and outputs a message packet that includes information indicative of one or more of the sensed temperature, pressure, and other parameters. Any known tire parameter sensing algorithm may be used with the present invention.

The tire-based unit 34 also includes a memory 72 and a timer 74 that are operatively coupled to the controller 70. Alternatively, the memory 72 and the timer 74 may form portions of the controller 70. The tire parameter sensing algorithm is stored in the memory 72. The memory 72 also stores an identification code for identifying the tire-based unit 34. Each tire-based unit 34, 36, 38, and 40 has a unique associated identification code. The controller 70 includes the identification code in the output message packet.

The timer 74 provides the controller 70 with timing signals. The controller 70 uses the timing signals, in accordance with the tire parameter sensing algorithm, for monitoring the temperature sensor 64, pressure sensor 66, and other sensors 68 and for outputting the message packet. For example, the controller 70 may monitor the temperature sensor 64, pressure sensor 66, and other sensor 68 at intervals of four seconds and may output a message packet at intervals of one minute.

The tire-based unit 34 also includes signal transmitting circuitry 78 and signal receiving circuitry 80. The signal transmitting circuitry 78 is operatively coupled to the controller 70 and includes components, such as a radio frequency ("RF") amplifier (not shown) and other known components, for transmitting tire parameter signal 54 via a transmitting antenna 82. The signal transmitting circuitry 78 receives message packets from the controller 70 and transmits the message packets in the tire parameter signals 54. The message packets are modulated onto a constant frequency carrier signal using known modulation techniques, such as amplitude shift keying ("ASK"). Other signal modulation techniques are also contemplated by the present invention, such as frequency shift keying, on-off keying, etc.

The signal receiving circuitry 80 is operatively coupled controller 70. The signal receiving circuitry is also operatively coupled to a receiving antenna 84 and receives signals from the receiving antenna 84. The signal receiving circuitry 80 is adapted to receive initiation signals 90 from the vehicle-based unit 42. The signal receiving circuitry 80 includes signal conditioning circuitry (not shown), such as filters, amplifiers, etc. In response to receiving an initiation signal 90 from the vehicle-based unit 42 having a signal-to-noise ratio that is above a predetermined value, the signal receiving circuitry 80 provides a signal to the controller 70 that prompts the controller to cause transmission of the tire parameter signal 54. When the signal receiving circuitry 80 receives an initiation signal 90 from the vehicle-based unit 42 having a signal-to-noise ratio that is less than the predetermined value, the signal receiving circuitry 80 does not provide a prompting signal to the controller 70.

The tire-based unit 34 also includes a power source 92. The power source 92 of the tire-based unit 34 provides electrical power to the controller 70, the signal transmitting circuitry 78, and the signal receiving circuitry 80. The power source 92 is preferably a long life lithium battery.

Figure 3:
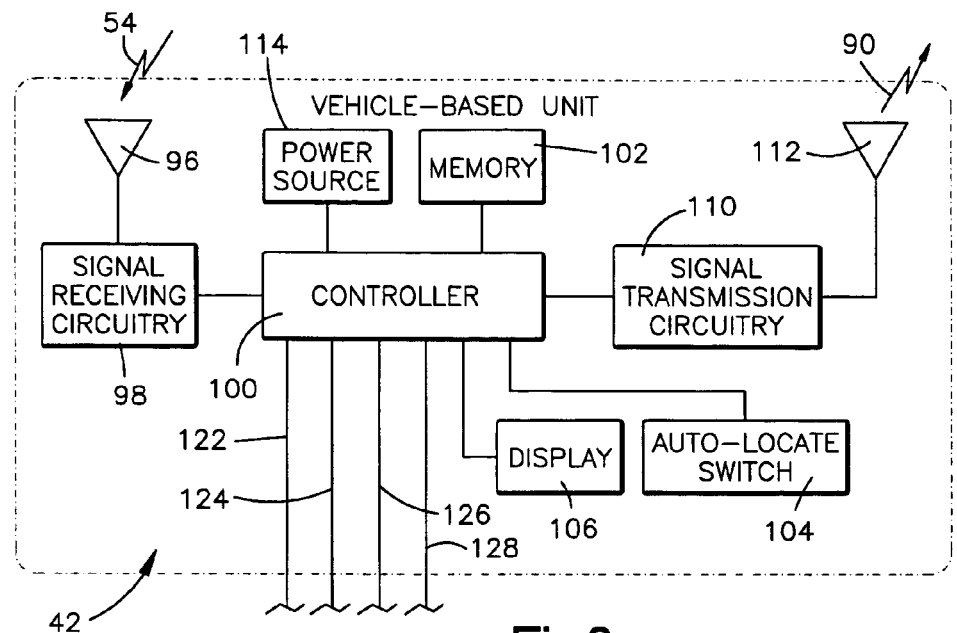
FIG. 3 is a schematic block diagram of an exemplary vehicle-based unit of the tire parameter sensing system of FIG. 1.

FIG. 3 is a schematic block diagram of an exemplary embodiment of the vehicle-based unit 42 of the tire parameter sensing system 12 of FIG. 1. The vehicle-based unit 42 includes a receiving antenna 96 that is coupled to signal receiving circuitry 98. The signal receiving circuitry 98 receives tire parameter signals, e.g., signal 54, from the receiving antenna 96. The signal receiving circuitry 98 includes signal conditioning circuitry (not shown), such as filters, amplifiers, etc. The signal receiving circuitry 98 also includes signal demodulating circuitry (not shown) for demodulating the received tire parameter signals and for outputting message packets received in the received signals to a controller 100 of the vehicle-based unit 42.

The controller 100 of the vehicle-based unit 42 is preferably a microcomputer. Alternatively, the controller 100 may be formed from discrete circuitry, an application-specific-integrated-circuit ("ASIC"), or any other type of control circuitry. The controller 100 also performs a tire parameter sensing algorithm.

The controller 100, upon receiving a message packet from the signal receiving circuitry 98, determines whether the message packet originated in one of the tire-based units 34, 36, 38, or 40 (FIG. 1) of the tire parameter sensing system 12. To determine whether the message packet originated in one of the tire-based units 34, 36, 38, or 40, the controller 100 compares the identification code received in the message packet to identification codes stored in a memory 102 associated with the controller 100. The memory 102 includes a lookup table having the identification codes of the tire-based units 34, 36, 38, and 40 that are associated with vehicle locations. For example, with reference to FIG. 1, the look-up table stored in memory 102 associates the identification code of tire-based unit 34 with the front left corner location of the vehicle 10. As is discussed below, the lookup table is updatable in response to actuation of an auto-locate switch 104 of the vehicle-based unit 42.

When the controller 100 determines that the received message packet did not originate in one of the tire-based units 34, 36, 38, or 40, the controller 100 ignores the message packet. When the controller 100 determines that the received message packet did originate in one of the tire-based units 34, 36, 38, or 40, the controller 100 analyzes the tire parameter information received in the message packet, i.e., the information indicating the temperature, the pressure, and/or the other sensed parameters.

The controller 100, after analyzing the tire parameter information received in the message packet, outputs display signals to a display 106. The display 106 is located in the occupant compartment of the vehicle 10 and is operatively coupled to the controller 100. The display 106 is responsive to receipt of the display signals for providing an indication of the tire parameter information and associated tire location to the vehicle operator. For example, the display 54 may indicate the sensed tire temperature and sensed tire pressure of each tire 16, 18, 20, and 22 to the vehicle operator.

The vehicle-based unit 42 also includes signal transmission circuitry 110. The signal transmission circuitry 110 is operatively coupled to the controller 100 and is responsive to commands from the controller 100 for transmitting an initiation signal 90 via transmitting antenna 112. Preferably, the transmitted initiation signal 90 is a low frequency ("LF") signal.

The vehicle-based unit 42 also includes a power source 114. The power source 114 of the vehicle-based unit 42 provides electrical power to the controller 100, the signal receiving circuitry 98, and the signal transmission circuitry 110. The power source 114 is preferably the battery of the vehicle 10 through an appropriate voltage regulator (not shown).

Figure 4:
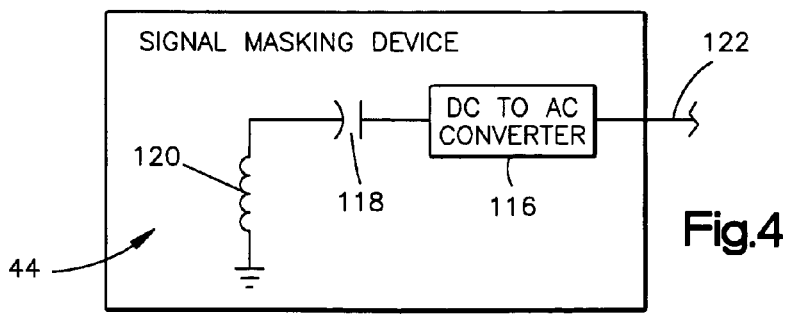
FIG. 4 illustrates an exemplary signal masking device of the tire parameter sensing system of FIG. 1.

FIG. 4 illustrates an exemplary signal masking device for use as part of the tire parameter sensing system 12 of FIG. 1. For purposes of example, FIG. 4 only illustrates signal masking device 44. Signal masking devices 46, 48, and 50 may have structures that are similar to signal masking device 44 and operate in a manner similar to signal masking device 44.

The signal masking device 44 of FIG. 4 includes a direct current ("DC") to alternating current ("AC") converter 116 and an LC circuit that includes a capacitor 118 and an inductor 120 connected in series. As an alternative to locating the DC to AC converter 116 in the signal masking device 44, the vehicle-based unit may have a centrally located DC to AC converter for use by all of the signal masking devices 44, 46, 48, and 50.

As shown in FIG. 1, a wire 122 operatively couples the signal masking device 44 to the vehicle-based unit 42. FIG. 3 shows wire 122 connecting to the controller 100 of the vehicle-based unit 42. The signal masking device 44 is responsive to electrical power supplied from the controller 100 to provide a resonant frequency signal that is tuned so as to reduce the ability of its associated or adjacent tire-based unit, i.e., tire-based unit 34, to receive the initiation signals 90 transmitted from the vehicle-based unit 42. More specifically, when the controller 100 of the vehicle-based unit 42 actuates the signal masking device 44, the resonant frequency signal provided by the signal masking device 44 results in the signal-to-noise ratio of an initiation signal 90 received by the associated adjacent tire-based unit, i.e., tire-based unit 34, being below the predetermined value. As a result, the tire-based unit 34 will not respond to the initiation signals 90 transmitted by the vehicle-based unit 42 because the signal receiving circuitry 80 only responds to an initiation signal having a signal-to-noise ratio that is greater than a predetermined value.

Although FIG. 4 illustrates the signal masking device 44 as being an LC circuit, other devices for masking an adjacent tire-based unit are also contemplated by the present invention. The LC circuit offers a simple, low cost construction.

As shown in FIG. 1, wires 124, 126, and 128 connect signal masking devices 46, 48, and 50, respectively, to the vehicle-based unit 42. FIG. 3 illustrates wires 124, 126, and 128 being connected to the controller 100 of the vehicle-based unit 42. The controller 100 controls signal masking devices 46 in a manner similar to signal masking device 44 to reduce the ability of the adjacent tire-based units to respond to the initiation signals 90 from the vehicle-based unit 42.

The controller 100 of the vehicle-based unit 42, in response to actuation of the auto-locate switch 104, enters an auto-locate mode in which the lookup table that is stored in the memory 102 is updated with the identification codes of the tire-based units 34, 36, 38, and 40 and their associated vehicle corner locations. More specifically, in response to actuation of the auto-locate switch 104, the controller 100 learns the identification code of the tire-based unit located in each associated vehicle corner location.

The controller 100 performs an auto-locate process in which the controller systematically actuates the signal masking devices 44, 46, 48, and 50 for learning the associated location of the tire-based units 34, 36, 38, and 40. FIG. 5 is a flow diagram illustrating an exemplary auto-locate process 500 that may be performed by the controller 100 of the vehicle-based unit 42 of the tire parameter sensing system 12 of the present invention.

The process 500 of FIG. 5 starts at step 502. Step 502 may be responsive to the vehicle ignition (not shown) being turned to the RUN position. From step 502, the process 500 proceeds to step 504. At step 504, a determination is made as to whether the auto-locate switch 104 of the vehicle-based unit 42 has been actuated. When the determination at step 504 is negative, the process 500 loops back upon itself until the auto-locate switch 104 has been actuated. When the determination at step 504 is affirmative, the process 500 proceeds to step 506.

At step 506, the signal masking devices are actuated in all but a first known vehicle corner location. For example, with reference to FIG. 1, when the first corner location is the front left corner of the vehicle 10, at step 506, signal masking devices 46, 48, and 50 are actuated and signal masking device 44 remains unactuated. From step 506, the process 500 proceeds to step 508.

At step 508, an initiation signal 90 is transmitted. In the above example, since signal masking devices 46, 48, and 50 have been actuated, the signal-to-noise ratio of the initiation signal 90 at tire-based units 36, 38, and 40 is below the predetermined value. Since signal masking device 44 is unactuated, the signal-to-noise ratio of the initiation signal 90 at tire-based unit 34 is above the predetermined value. In response to the signal-to-noise ratio being above the predetermined value, tire-based unit 34 responds with its tire parameter signal 54.

Figure 6:
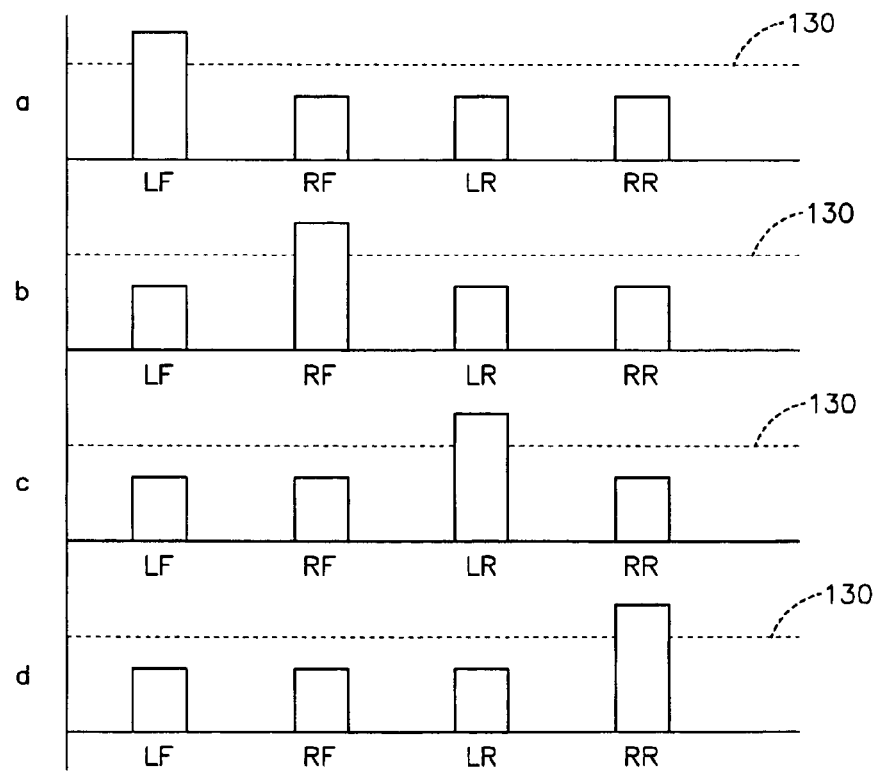
FIGS. 6*a*–6*d* graphical illustrates the signal-to-noise ratio of initiation signals received by tire-based units at various vehicle locations during performance of the process of FIG. 5.

FIG. 6a graphically illustrates the signal-to-noise ratios at various locations of the vehicle 10 when signal masking device 44 is unactuated and signal masking devices 46, 48, and 50 are actuated. In FIG. 6a, LF represents the left front corner of the vehicle adjacent signal masking device 44, RF represents the right front corner of the vehicle 10 adjacent signal masking device 46, LR represents the left rear corner of the vehicle 10 adjacent signal masking device 48, and RR represents the right rear corner of the vehicle 10 adjacent signal masking device 50. The dashed line 130 in FIG. 6a represents the predetermined value of the signal-to-noise ratio. In a preferred embodiment, the predetermined value of the signal-to-noise ratio is about 12 dB. As FIG. 6a illustrates, when signal masking device 44 is unactuated and signal masking devices 46, 48, and 50 are actuated, the signal-to-noise ratio is only above the predetermined value at the front left corner location of the vehicle.

At step 510 of the process 500 of FIG. 5, the vehicle-based unit 42 listens for a tire parameter signal and at step 512 a determination is made as to whether a tire parameter signal has been received. When the determination at step 512 is negative, the process 500 returns to step 508 and another initiation signal 90 is transmitted. When the determination at step 512 is affirmative, the process 500 proceeds to step 514.

At step 514, the identification code of the received tire parameter signal is associated with the location of the unactuated signal masking device. Thus, in the above example, the identification code of the tire parameter signal is associated with the location of signal masking device 44, which is located at the front left corner location of the vehicle 10. At step 516, steps 508 through 514 are repeated until the same identification code is received a predefined number, indicated as X, of consecutive times. Step 516 ensures that an identification code of a randomly transmitted tire parameter signal is not mistakenly associated with a vehicle corner location. Once the identification code associated with that corner location is determined, the look-up table of memory 102 is updated with the identification code.

The process 500 proceeds from step 516 to step 518. At step 518, a determination is made as to whether all of the vehicle corner locations have been initiated. Thus, at step 518, a determination is made as to whether all of the signal masking devices 44, 46, 48, and 50 have been left unactuated to associate identification codes to their associated vehicle locations. When the determination at step 518 is negative, the process 500 proceeds to step 520 and the location of the unactuated signal masking device is changed. For example, signal masking device 46 is next left unactuated and signal masking devices 44, 48, and 50 are actuated. From step 520, the process 500 returns to step 508. When the determination at step 518 is affirmative meaning that all of the signal masking devices have been left unactuated or the identification codes of all of the tire-based units have been learned, the process 500 proceeds to step 522 and the process ends.

FIGS. 6b–d are similar to FIG. 6a and graphically illustrates the signal-to-noise ratios at various corner locations of the vehicle 10 when one signal masking device is unactuated and the other signal masking devices are actuated. In FIG. 6b, signal masking device 46 is unactuated and signal masking devices 44, 48, and 50 are actuated. As a result, in FIG. 6b, the signal-to-noise ratio is above the predetermined value 130 only at the right front corner location of the vehicle 10. In FIG. 6c, signal masking device 48 is unactuated and signal masking devices 44, 46, and 50 are actuated. As a result, in FIG. 6c, the signal-to-noise ratio is above the predetermined value 130 only at the left rear corner location of the vehicle 10. Similarly, in FIG. 6d, signal masking device 50 is unactuated and signal masking devices 44, 46, and 48 are actuated. As a result, in FIG. 6d, the signal-to-noise ratio is above the predetermined value 130 only at the right rear corner location of the vehicle 10.

Thus, when controller 100 of the vehicle-based unit 42 performs the auto-locate process, the identification code of each of the associated corner locations of the tire-based units on the vehicle are determined and are stored in the memory 102. The vehicle-based unit 42 may then provide an indication on display 106 of the tire parameter information at each associated location of the vehicle 10.

Figure 7:
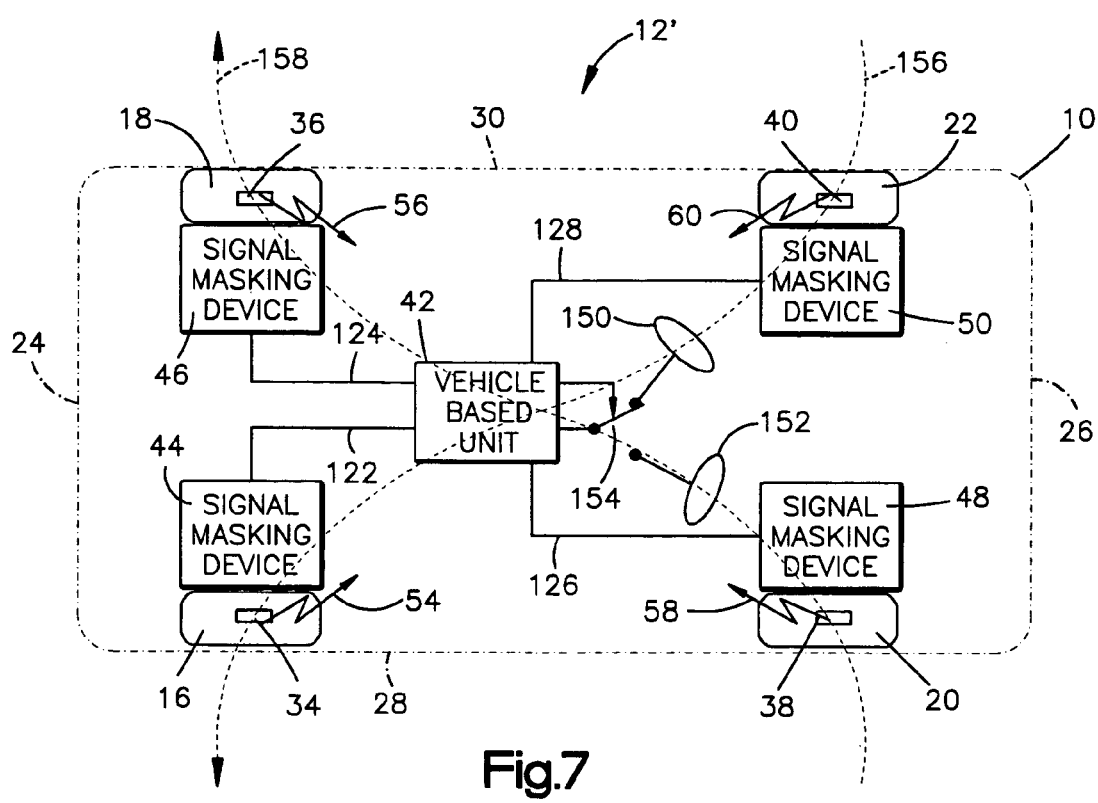
FIG. 7 schematically illustrates a vehicle including a tire parameter sensing system constructed in accordance with a second exemplary embodiment of the present invention.

FIG. 7 schematically illustrates a vehicle 10 including a tire parameter sensing system 12' constructed in accordance with a second exemplary embodiment of the present invention. Structures of FIG. 7 that are the same or similar as structures in FIG. 1 are labeled with the same reference number as in FIG. 1 and are not discussed in detail with regard to FIG. 7.

The tire parameter sensing system 12' of FIG. 7 is identical with the tire parameter sensing system 12 of FIG. 1 with the exception of the transmission antenna portion of the vehicle-based unit 42. The tire parameter sensing system of FIG. 7 replaces transmission antenna 112 (FIG. 3) with first and second low frequency coil antennas 150 and 152, respectively. A switch 154 is controllably coupled to the controller of the vehicle-based unit 42 for connecting one of the low frequency coil antennas 150 and 152 to the signal transmission circuitry of the vehicle-based unit 42.

The first low frequency coil antenna 150 is positioned relative to the vehicle 10 so as to provide initiation signals along the path illustrated by dashed line 156. The switch 154 is connected to the first low frequency coil antenna 150 when actuation of either tire-based units 34 or 40 is desired.

The second low frequency coil antenna 152 is positioned relative to the vehicle 10 so as to provide initiation signals along the path illustrated by dashed line 158. The switch 154 is connected to the second low frequency coil antenna 152 when actuation of either tire-based units 36 or 38 is desired. The directional initiation paths 156 and 158 of the first and second low frequency coil antennas 150 and 152 further aid the vehicle-based unit 42 in controlling which of the tire-based units are initiated. The tire-based units located outside of the active initiation path will have signal-to-noise ratios below the predetermined value. Thus, the signal masking is only required with the tire-based units located on the active initiation path.

From the above description of the invention, those skilled in the art will perceive improvements, changes and modifications. Such improvements, changes and modifications within the skill of the art are intended to be covered by the appended claims.

Having described the invention, the following is claimed:

1. A tire parameter sensing system for a vehicle having a plurality of tires, the tire parameter sensing system comprising:
    a plurality of tire-based parameter sensing units, each tire-based unit having an associated tire and being configured to receive initiation signals and, in response thereto, to transmit response signals;
    a vehicle-based unit for receiving response signals from the tire-based units and for transmitting the initiation signals to the tire-based units; and
    a plurality of signal masking devices coupled to the vehicle-based unit, each of the signal masking devices having an associated tire location in which a tire-based unit is located, each signal masking device being actuatable for masking the initiation signals near its associated tire location, actuation of a masking device blocking receipt of the initiation signal by its associated tire-based unit,
    the vehicle-based unit controlling the signal masking devices so as to control the associated tire location from which a tire-based unit responds to the initiation signals.

2. The tire parameter sensing system of claim 1 wherein each signal masking devices is a noise source that, when actuated, reduces a signal-to-noise ratio of the initiation signals at the associated tire location to below a predetermined threshold value required for a tire-based unit located in the associated tire location to be responsive to the initiation signals.

3. The tire parameter sensing system of claim 2 wherein each noise source comprises a capacitor and an inductor in series with one another for producing noise when supplied with an alternating current.

4. The tire parameter sensing system of claim 1 wherein each response signal includes an identification portion that identifies the tire-based unit that transmitted the response signal, the vehicle-based unit including means for associating the identification portion of received response signals with the associated tire location having a non-actuated masking device.

5. The tire parameter sensing system of claim 1 wherein the vehicle-based unit includes first and second antennas and a switch for connecting to one of the first and second antennas, the first antenna directing initiation signals along a first path and the second antenna directing initiation signals along a second, different path.

6. A tire parameter sensing system for a vehicle having a plurality of tires, the tire parameter sensing system comprising:
    a plurality of tire-based units, each of the plurality of tire-based units having an associated tire and including a receiving portion for receiving an initiation signal, a sensing portion for sensing a parameter of the associated tire, and a transmitting portion for transmitting a parameter signal indicative of the sensed parameter, each of the tire-based units being responsive to a received initiation signal having a signal-to-noise ratio exceeding a predetermined value for transmitting the parameter signal;
    a vehicle-based unit including a transmitter for transmitting initiation signals to the tire-based units and a receiver for receiving parameter signals from the tire-based units; and
    a plurality of noise sources coupled to the vehicle-based unit and actuatable by the vehicle-based unit for transmitting noise, each of the noise sources having an associated tire-based unit and, when actuated, affecting the signal-to-noise ratio of any initiation signal within a predetermined area relative to the actuated noise source,
    the vehicle-based unit controlling initiation the tire-based units by controlling actuation of the noise sources.

7. The tire parameter sensing system of claim 6 wherein each parameter signal includes an identification portion that identifies the tire-based unit that transmitted the parameter signal, the vehicle-based unit determining which tire-based unit is associated with each noise source and associating the identification portion of parameter signals transmitted by the associated tire-based unit with a location on the vehicle of the noise source.

8. The tire parameter sensing system of claim 6 wherein each noise sources comprise a capacitor and an inductor in series with one another for producing noise when supplied with an alternating current.

9. The tire parameter sensing system of claim 6 wherein the vehicle-based unit includes first and second antennas and a switch for connecting to one of the first and second antennas, the first antenna directing initiation signals along a first path and the second antenna directing initiation signals along a second, different path.

10. A method for determining associated locations on a vehicle of tire-based units of a tire parameter sensing system, the method comprising the steps of:
    transmitting an initiation signal from a vehicle-based unit;
    controlling actuation of a plurality of signal masking devices during transmission of the initiation signal so that only a tire-based unit located near a first signal masking device responds to the transmitted initiation signal;
    receiving a parameter signal from the tire based unit responding to the initiation signal; and
    associating the responding tire-based unit with a location on the vehicle of the first signal masking device.

11. The method of claim 10 further including the steps of:
transmitting subsequent initiation signals;
receiving subsequent parameter signals from the responding tire-based unit; and
associating the responding tire-based unit to the first signal masking device only after receiving an identification portion of the responding tire-based unit a predetermined number of times.

12. The method of claim 10 further including the steps of:
transmitting a subsequent initiation signal from the vehicle-based unit;
controlling actuation of the plurality of signal masking devices during transmission of the subsequent initiation signal so that only a tire-based unit associated with a second signal masking device responds to the transmitted initiation signal;
receiving a parameter signal from the tire-based unit responding to the subsequent initiation signal; and
associating the tire-based unit responding to the subsequent initiation signal with a location on the vehicle of the second signal masking device.

13. The method of claim 10 wherein the step of controlling actuation of a plurality of signal masking devices during transmission of the initiation signal so that only a tire-based unit associated with a first signal masking device responds to the transmitted initiation signal includes the step of:
actuating each of the plurality of signal masking devices except the first signal masking device during transmission of the initiation signal.

14. The method of claim 10 wherein the step of transmitting an initiation signal from a vehicle-based unit further includes the step of controlling a switch for connecting to one of first and second antennas.

* * * * *